United States Patent [19]

Satomi

[11] 4,279,497
[45] Jul. 21, 1981

[54] ELECTROSTATIC COPYING MACHINE

[75] Inventor: Toyokazu Satomi, Tokyo, Japan

[73] Assignee: Ricoh Company, Ltd., Tokyo, Japan

[21] Appl. No.: 108,187

[22] Filed: Dec. 27, 1979

Related U.S. Application Data

[63] Continuation of Ser. No. 795,610, May 10, 1977, abandoned.

[30] Foreign Application Priority Data

May 18, 1976 [JP] Japan .................................. 51/56999
Jun. 2, 1976 [JP] Japan .................................. 51/64319
Jun. 19, 1976 [JP] Japan .................................. 51/72601

[51] Int. Cl.³ ..................... G03G 15/28; G03G 15/32; G03B 27/34
[52] U.S. Cl. ........................................ 355/8; 355/11; 355/51; 355/57; 355/71
[58] Field of Search ...................... 355/8, 3 R, 11, 51, 355/67, 60, 65, 66, 71, 57

[56] References Cited

U.S. PATENT DOCUMENTS

| | | | |
|---|---|---|---|
| 4,017,170 | 4/1977 | Komori et al. | 355/3 R |
| 4,125,323 | 11/1978 | Ikeda et al. | 355/8 |
| 4,139,297 | 2/1979 | Hayashi et al. | 355/8 |
| 4,171,905 | 10/1979 | Boschet | 355/71 |

OTHER PUBLICATIONS

Xerox Disclosure Journal, "Illumination Slit For A Reproducing Machine", vol. 2, No. 5, Sep./Oct. 1977, Allis, pp. 113-115.

Primary Examiner—Richard A. Wintercorn
Attorney, Agent, or Firm—David G. Alexander

[57] ABSTRACT

A variable magnification optical system focusses an image of a portion of an original document on a platen through a variable aperture or slit onto a rotating photoconductive drum. Various members of the optical system or the document are moved at a speed corresponding to the surface speed of the drum to scan the document and form an electrostatic image thereof on the drum. The slit is defined by a fixed aperture plate and a movable aperture plate disposed upstream of the fixed aperture plate in the direction of rotation of the drum. A variable transmission connected between an exposure knob and the movable aperture plate transmits rotation of the knob to the movable aperture plate at a rate corresponding to the magnification. In addition, a side edge of the document is aligned at the same position for all magnifications. The movable aperture plate is formed with a curved edge facing the fixed aperture plate, the center of the curved edge being aligned with the center of the image at all magnifications. As end plate is positioned by a sheet feed mechanism to prevent image formation on a portion of the drum in which the image would not be transferred to an undersized copy sheet.

33 Claims, 19 Drawing Figures

ELECTROSTATIC COPYING MACHINE

CROSS REFERENCE TO RELATED APPLICATION

This application is a continuation of copending U.S. Patent application Ser. No. 795,610, filed May 10, 1977, now abandoned.

BACKGROUND OF THE INVENTION

The present invention relates to an electrostatic copying machine comprising an improved variable magnification optical system.

In an electrostatic copying machine of the present type, a light image of an original document is focussed onto a photoconductive drum creating an electrostatic image thereon through localized photoconduction. A toner substance is applied to the drum to develop the electrostatic image into a visible toner image, which is transferred and fixed to a copy sheet to provide a permanent reproduction of the original document.

In forming the electrostatic image, an elongated light image of a portion of the document is focussed through an aperture or slit onto the drum. The document or various members of the optical system are moved at a speed corresponding to that of the drum to scan the document.

In prior art optical systems which provide variable magnification, typically allowing a full size reproduction and one or more reduction ratios, the document must be placed at various positions on a document supporting platen depending on the magnification. This is a nuisance and the cause of many unacceptable copies produced by unskilled machine operators. For this reason, variable magnification optical systems have been developed which allow the document to be placed in the same position on the platen regardless of the desired magnification.

Such systems have heretofore not been perfected, however, and have certain drawbacks. The most serious is, perhaps, imprecise exprecise exposure control through varying the width of the slit. The correct slit width is a function not only of the intensity of the illuminating light source and drum photoconductive sensitivity but also of the magnification. Heretofore developed variable magnification optical systems for copying machines do not comprise means for effective exposure control and produce many unsatisfactory copies for this reason.

Another problem resides in the fact that the light image intensity drops off at the edges of the image. This has been compensated for in the prior art by making one aperture plate defining the slit curved in such a manner that the width of the slit or aperture is wider at the ends thereof. However, this expedient does not allow the document to be positioned on the platen such that a side edge thereof is always at the same position regardless of magnification, since the copies thus produced will be darker at one side edge than the other depending on the magnification. Still another problem which has remained heretofore unsolved is that of preventing exposure of portions of the drum in which the image would not be transferred to an undersized copy sheet.

SUMMARY OF THE INVENTION

In accordance with the present invention, a variable magnification optical system focusses an image of a portion of an original document on a platen through a variable aperture or slit onto a rotating photoconductive drum. Various members of the optical system or the document are moved at a speed corresponding to the surface speed of the drum to scan the document and form an electrostatic image thereof on the drum. The optical system is constructed so that the leading edge of the document is aligned at the same position on the platen for all magnifications. The slit is defined by a fixed aperture plate and a movable aperture plate disposed upstream of the fixed aperture plate in the direction of rotation of the drum. A variable transmission connected between an exposure knob and the movable aperture plate transmits rotation of the knob to the fixed aperture plate at a rate corresponding to the magnification. In one form of the invention, a side edge of the document is aligned at the same position for all magnifications. In this case, the movable aperture plate is formed with a curved edge facing the fixed aperture plate, the center of said curved edge being aligned with the center of the image at all magnifications. An end plate is positioned by a sheet feed mechanism to prevent image formation on a portion of the drum in which the image would not be transferred to an undersized copy sheet.

It is an object of the present invention to provide an electrostatic copying machine comprising a variable magnification optical system in which an original document may be placed with two adjacent edges aligned with the same two positions on a platen regardless of the magnification.

It is another object of the present invention to provide an electrostatic copying machine comprising a variable magnification optical system and effective means for controlling the exposure at all magnifications.

It is another object of the present invention to provide an electrostatic copying machine comprising a variable magnification optical system which provides even exposure at all magnifications.

It is another object of the present invention to provide an electrostatic copying machine comprising a variable exposure optical system which prevents exposure of unused portions of a photoconductive drum.

It is another object of the present invention to provide a generally improved electrostatic copying machine.

Other objects, together with the foregoing, are attained in the embodiments described in the following description and illustrated in the accompanying drawing.

DESCRIPTION OF THE PREFERRED EMBODIMENTS

While the electrostatic copying machine of the invention is susceptible of numerous physical embodiments, depending upon the environment and requirements of use, substantial numbers of the herein shown and described embodiments have been made, tested and used, and all have performed in an eminently satisfactory manner.

Figure 1:
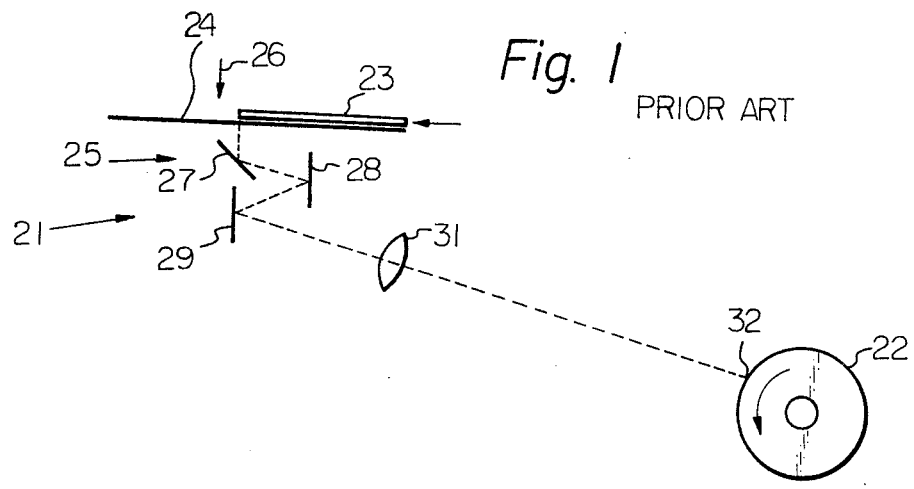
FIGS. 1 and 2 are diagrams illustrating the operation of a prior art optical system for an electrostatic copying machine.

Referring now to FIG. 1 of the drawing, a prior art electrostatic copying machine is generally designated as 21 and comprises a photoconductive drum 22 which is rotated counterclockwise at constant speed. An original document 23 is placed face down on a glass platen 24 which supports the same. An illumination lamp (not shown) illuminates the document 23 from below. An image of a portion of the document 23 disposed at a position indicated by an arrow 26 is reflected from a mirror 27 to a mirror 28, from the mirror 28 to a mirror 29 and reflected from the mirror 29 through a converging lens 31. The lens 31 refracts the image and focusses the same onto the surface of the drum 22 at a position indicated as 32. It will be seen that the left edge of the document 23 is disposed at the position of the arrow 26 in FIG. 1. From this position, the platen 24 and document 23 are moved leftwardly as a unit at the same surface speed as the drum 22, with the left edge of the document 23 constituting the leading edge thereof in the direction of movement. As a result, all portions of the document 23 occupy the position of the arrow 26 in a progressive manner and images of these respective portions are focussed onto the drum 22 at 32 thereby constituting a scanning operation. An electrostatic image of the document 23 is formed on the drum 22 in this manner.

More specifically, the drum 22 is electrostatically charged by a corona discharge unit which is not shown. The light image of the document 23 causes localized photoconduction which creates the electrostatic image. A developing or toner substance is applied to the drum 22 and adheres to the dark image areas of the electrostatic image, thereby forming a toner image. This toner image is transferred and fixed to a copy sheet to form a permanent reproduction of the original document 23 although the means for performing these operations are not the subject matter of the present invention and are not shown. The optical path of the light image is indicated in broken line.

Figure 2:
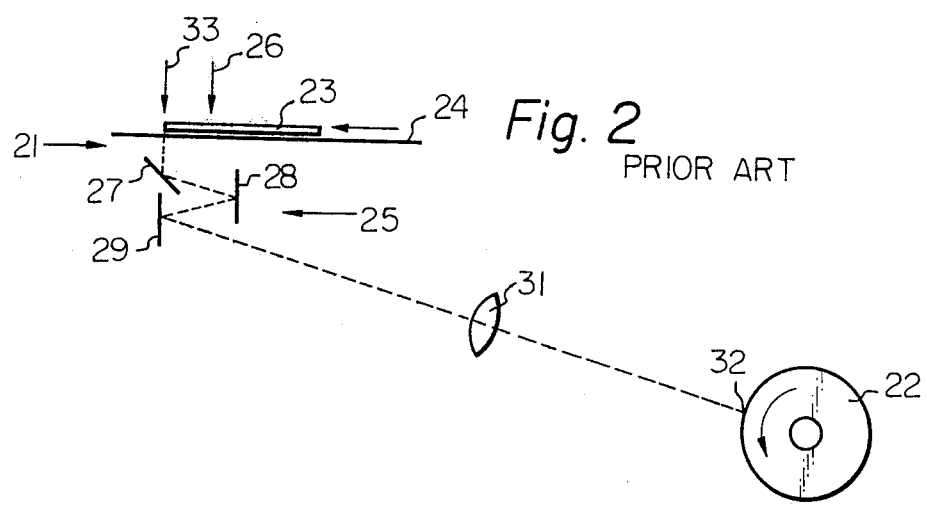

The mirrors 27, 28 and 29 and lens 31 constitute a variable magnification optical system which is generally designated as 25. As shown in FIG. 1, the optical system 25 is set to produce a full size light image of the document 23 on the drum 22. As shown in FIG. 2, the positional relationships between the various components of the optical system 25 are changed to make a reduced size copy. More specifically, the mirrors 27, 28 and 29 are shifted leftwardly to increase the length of the optical path and reduce the size of the image. The lens 31 is shifted toward the drum 22 to correct the focus of the image. Furthermore, the speed of leftward movement of the platen 24 and document 23 is suitably changed relative to the surface speed of the drum 22. The drawback of the optical system 25 is that the leading edge of the document 23 cannot be aligned with the arrow 26 at the initiation of scanning but must be aligned with an arrow 33 which is shifted leftwardly from the position of the arrow 26. In other words, the leading edge of the document 23 must be positioned at a different place for each value of magnification at the initiation of scanning. This drawback has led to the production of large numbers of unacceptable copies by unskilled machine operators with the toner images registered incorrectly in the vertical direction on the copy sheets.

Figure 3:
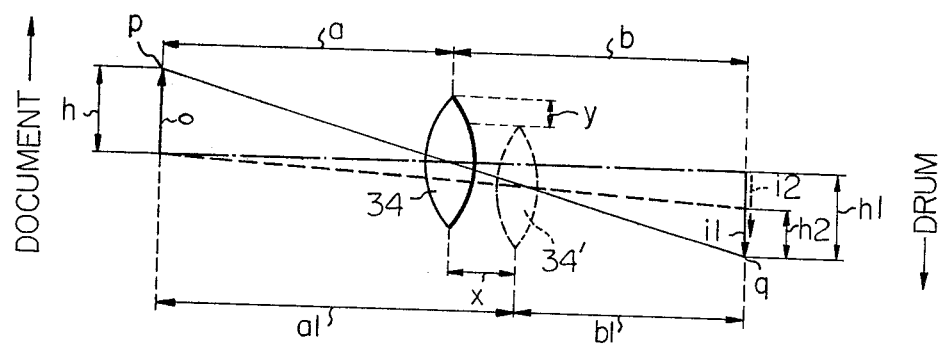
FIGS. 3 and 4 are diagrams illustrating the principles of two optical systems of the present invention.
Figure 4:
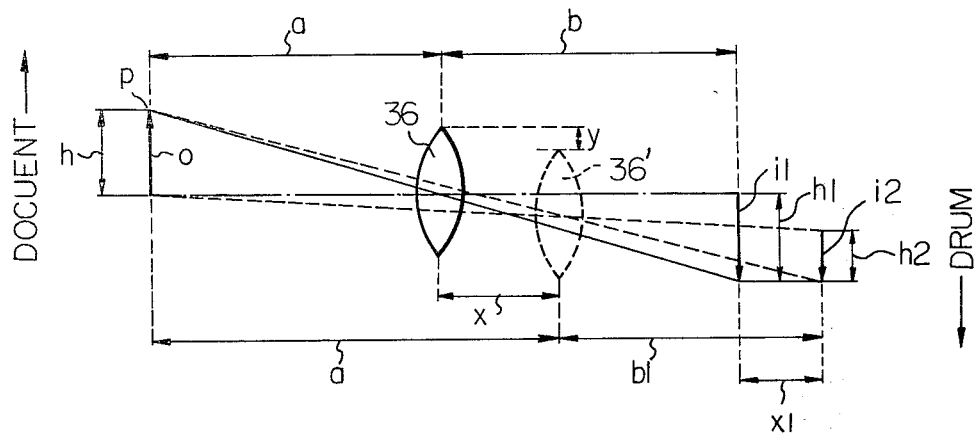

This problem is overcome in accordance with two forms of the invention graphically illustrated in FIGS. 3 and 4.

In FIG. 3 a variable focal length converging lens is symbolically shown and designated as 34. An arrow o having a length h is assumed to be printed on an original document (not shown) and is to be copied. The arrow o (document) is to be moved upwardly for scanning, with the point of the arrow o (leading edge of the document) initially disposed at p. The lens 34 focusses a real image of the arrow o onto a photoconductive drum (not shown) which is moved downwardly for scanning. With the lens 34 positioned as shown in solid line for full size reproduction (1:1 magnification), the image appears as an arrow shown in solid line and designated as i1. The arrow i1 has a length h1 which is equal to h. The point of the arrow i1 (leading edge of the image on the drum) is positioned at q. For 1:1 magnification a distance a between the arrow o and lens 34 is equal to a distance b between the lens 34 and the arrow i1. The focal length of the lens 34 for magnification $\lambda = 1$ is designated as f0.

To make a reduced size reproduction (magnification = $\lambda < 1$) the lens 34 is moved away from the arrow o. With the length of the optical path to remain constant, $2f0 = a = b$ and $b1 = \lambda a1$ where a1 and b1 are the new values of a and b for the new magnification $\lambda$. The distance X which the lens 34 must be shifted away from the arrow o is given as $$\frac{b1}{a1} = \frac{a-x}{a+x} = \lambda \tag{1}$$

which produces $$x = \frac{1-\lambda}{1+\lambda} \cdot a = \frac{1-\lambda}{1+\lambda} \cdot 2f0 \tag{2}$$

In order for the image to be in focus, the focal length of the lens 34 must be changed to a new value f1 as follows $$f1 = \frac{4f0\lambda}{(1+\lambda)^2} \tag{3}$$

These operations produce an image of the arrow o which appears as a broken line arrow i2 having a length h2. It will be noted that the points of the arrows i1 and i2 do not coincide since the point of the arrow i2 is spaced upwardly of q. Without correction, the arrow o would have to be positioned upwardly of p as indicated in FIG. 2 if a copy of correct vertical register were to be produced.

However, if the lens 34 is shifted downwardly as well as rightwardly to a phantom line position 34', the point of the arrow i2 will be shifted downwardly to q and the arrow o may be positioned as shown for the new magnification $\lambda$. In other words, the document may be positioned at the same place for both magnifications. The image of the arrow i2 thus produced has the same length h2 but is shifted downwardly, although not visible in the drawing. The distance Y which the lens 34 must be shifted downwardly is given as $$\frac{a}{h} = \frac{x}{y} \quad (4)$$

which produces $$y = \frac{h}{a} \cdot x = \frac{h}{2f_0} \cdot \frac{1-\lambda}{1+\lambda} \cdot 2f_0 = \frac{1-\lambda}{1+\lambda} \cdot h \quad (5)$$

In addition, the speed of movement of the document is increased by a factor of $1/\lambda$.

FIG. 4 shows how the same effect may be achieved using a lens 36 having a fixed focal length f. In FIG. 4, corresponding parameters are designated by the same reference characters used in FIG. 3.

In this case, $b1=a1\lambda$ and $a1=a+X$. The displacement X is given as $$\frac{1}{a+X} + \frac{1}{\lambda(a+X)} = \frac{1}{f} \quad (6)$$

which produces $$x = \frac{1-\lambda}{\lambda} \cdot f \quad (7)$$

For $\lambda=1$, the arrow i1 appears at a distance $a+b$ from the arrow o and has a height h1 which is equal to h. Also, $a=b$. For $\lambda \neq 1$, the arrow i2 is focussed at a distance $a1+b1=a+b+x1=a+b+x1$ from the arrow i1. In other words, the length of the optical path is increased by a distance x1.

The distance x1 is given by $$x1 = x + b1 - a \quad (8)$$

which produces $$x1 = \frac{(1-\lambda)^2}{\lambda} \cdot f \quad (9)$$

The displacement y is given as $$\frac{a1}{h+y} = \frac{b1}{h-y} \quad (10)$$

which produces $$y = \frac{1-\lambda}{1+\lambda} \cdot h \quad (11)$$

Again, the document scan speed is increased by a factor of $1/\lambda$.

The new position of the lens 36 is shown in phantom line and designated as 36'.

To summarize, the arrangement of FIG. 3 utilizes a variable focal length lens and maintains the length of the optical path constant. To change magnification, the lens 34 is displaced parallel to the optical path by a distance X, perpendicular to the optical path by a distance Y and the focal length is changed to F1 in accordance with equations (2), (5) and (3) respectively.

In the arrangement of FIG. 4, the lens 36 has a fixed focal length and the length of the optical path does not remain constant. To change magnification, the lens 36 is displaced parallel to the optical path by a distance X, perpendicular to optical path by a distance Y and the image receiving surface is displaced by a distance X1 in accordance with equations (7), (11) and (9) respectively.

Figure 5:
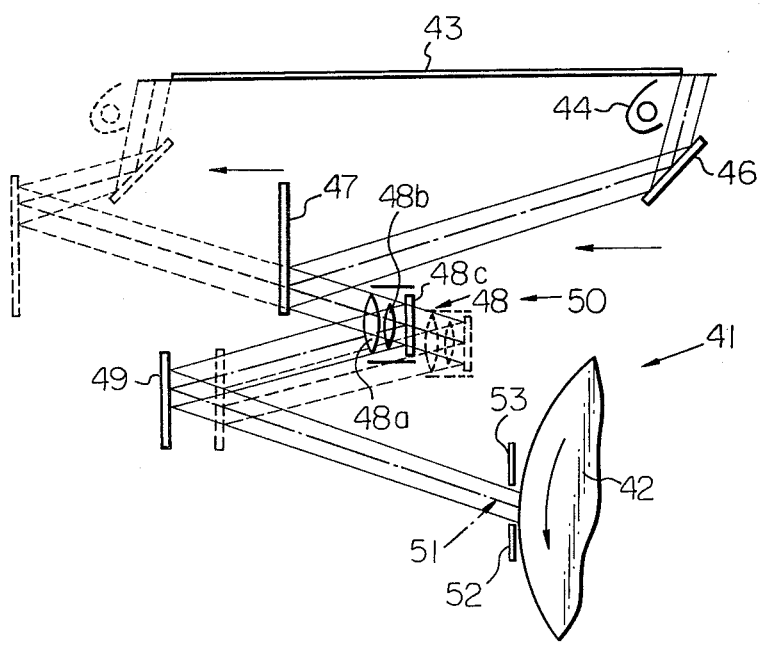
FIGS. 5 to 9 are schematic views illustrating respective optical systems embodying the principles shown in FIGS. 3 and 4.

Referring now to FIG. 5 an electrostatic copying machine of the present invention is designated as 41 and comprises a photoconductive drum 42 which is rotated counterclockwise at constant speed. An original document 43 is disposed on a platen (not shown) above the drum 42 and is held stationary. An illumination lamp 44 illuminates a portion of the document 43 thereabove and an image of the illuminated portion is reflected from a mirror 46 to a mirror 47. The mirror 47 reflects the image to a variable focal length lens assembly 48 which comprises lens elements 48a and 48b and a mirror 48c. The image is refracted by the lens elements 48a and 48b onto the mirror 48c from which it is reflected back through the lens elements 48a and 48b and further refracted thereby onto a mirror 49. From the mirror 49 the image is reflected through an aperture or slit 51 defined between a fixed aperture plate 52 and a movable aperture plate 53 onto the drum 42. For magnification $\lambda=1$, the lamp 44 and mirror 46 are moved leftwardly for scanning at the same surface speed as the drum 42. In addition, the mirror 47 is moved leftwardly at ½ the surface speed of the drum 42. The initial positions of the elements of the optical system shown in FIG. 5 which is generally designated as 50 are shown in solid line. The final positions thereof are shown in phantom line but not designated by reference numerals.

The solid line positions of the lens assembly 48 and mirror 49 are for magnification $\lambda-1$. To produce a reduced size copy ($\lambda<1$), the lens assembly 48 and the mirror 49 are moved rightwardly by the distance X in accordance with equation (2). The movement of the mirror 49 is to cancel out the effect on the length of the optical path of the movement of the lens assembly 48. The lens assembly 48 is shifted downwardly by the distance Y in accordance with equation (5) so that the leading edge of the image of the document 43 will be focussed onto the drum 42 at the same position as where $\lambda=1$.

Finally, the focal length of the lens assembly 48 is changed from f0 to f1 in accordance with equation (3). This may be accomplished in any known manner through varying the spacing between the lens elements 48a and 48b or interchanging the same. The positions for the lens assembly 48 and mirror 49 for reduced size copying are indicated in phantom line but not designated by reference numerals. For $\lambda \neq 1$, speeds of movement of the lamp 44, mirror 46 and mirror 47 are respectively multiplied by $1/\lambda$.

Figure 6:
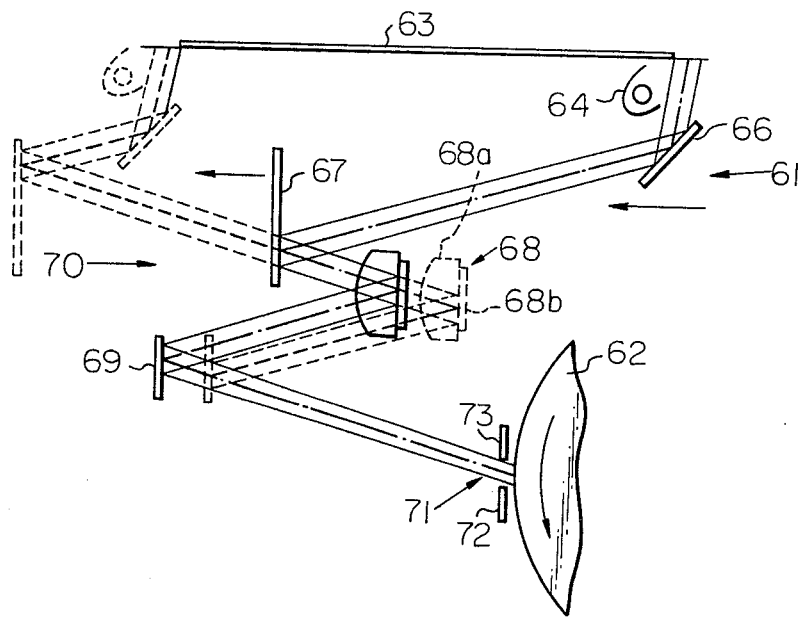

FIG. 6 shows another electrostatic copying machine 61 of the invention which comprises a photoconductive drum 62 which is rotated counterclockwise. An original document 63 is supported above the drum 62. An optical system 70 comprises a lamp 64 and mirrors 66, 67 and 69 which essentially correspond to the embodiment of FIG. 5. An aperture 71 defined by aperture plates 72 and 73 is also essentially similar. However, in the copying machine 61 the variable focal length lens assembly 48 is replaced by a lens assembly 68 of fixed focal length which comprises a converging lens element 68a mounted in front of a mirror 68b. The optical path is essentially similar to that of FIG. 5.

The positions of the elements of the optical system 70 shown in solid line are for $\lambda=1$. To make a reduced size copy the lens assembly 68 is moved parallel and perpendicular to the optical axis in accordance with equations (7) and (11) respectively. In addition, the mirror 69 is moved rightwardly by $(1/2\lambda)(1-\lambda^2)f$ as indicated in phantom line.

Figure 7:
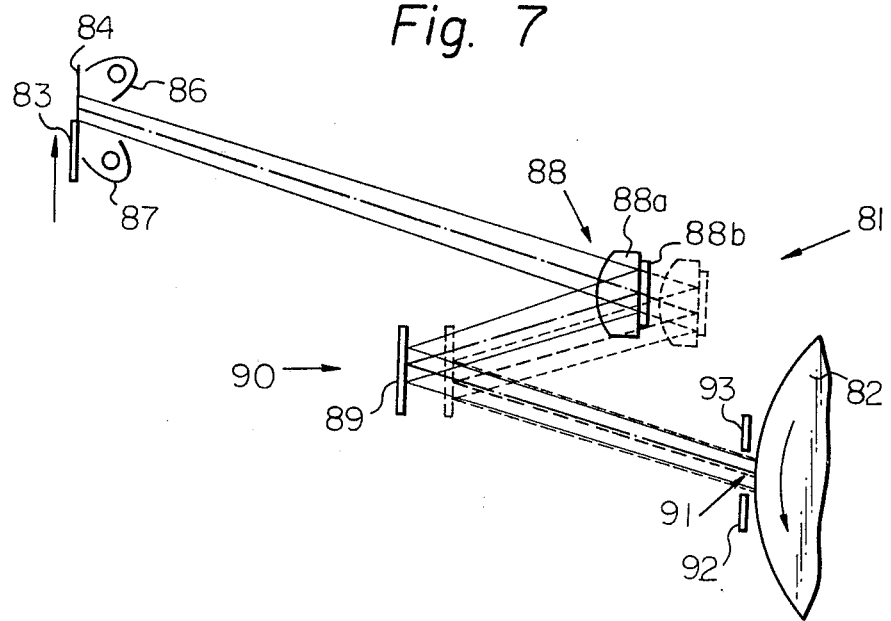
Figure 8:
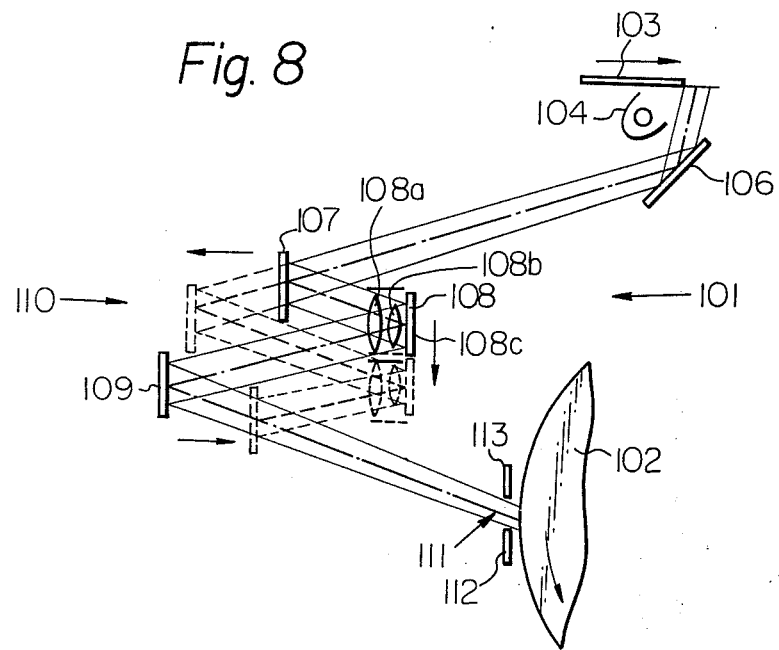
Figure 9:
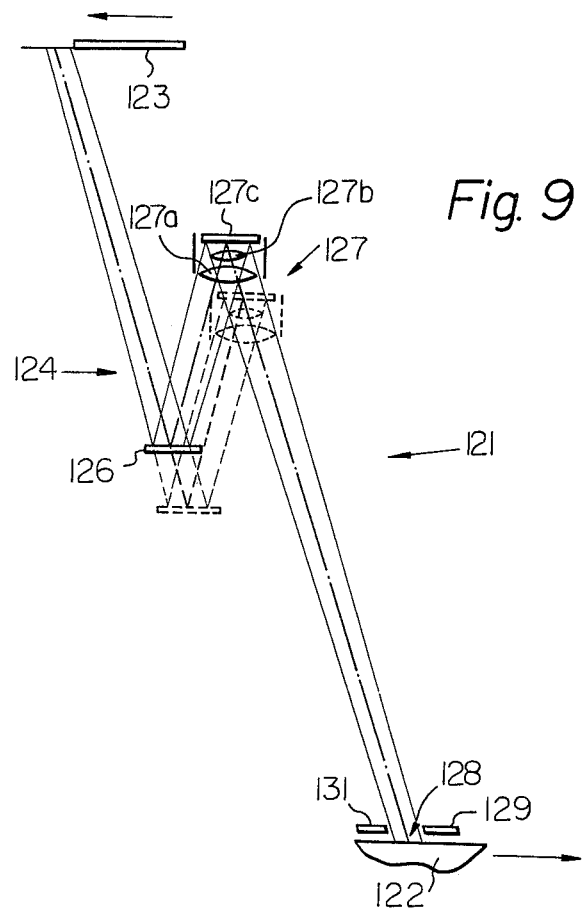

FIGS. 7, 8 and 9 show arrangements in which the various components of the optical systems are held stationary and the original document is moved relative thereto. In FIG. 7, a copying machine 81 comprises a photoconductive drum 82 which is rotated counter-clockwise at constant speed. An original document 83 is supported on a platen 84 which is shown as being oriented vertically only for simplicity of illustration. The document 83 and platen 84 are driven upwardly at the same surface speed as the drum 82 for scanning shere $\lambda=1$. Where $\lambda\neq 1$, the speed of movement of the document 83 is multiplied by $1/\lambda$.

Lamps 86 and 87 are provided to illuminate the adjacent portion of the document 83. An image of this portion is refracted by a converging lens element 88a of a lens assembly 88 onto a mirror 88b of the lens assembly 88 which is disposed behind the lens element 88a. From the mirror 88b the image is again refracted by the lens element 88a onto a mirror 89 and reflected from the mirror 89 through an aperture 91 onto the drum 82. The optical system shown in FIG. 7 is generally designated as 90. Aperture plates 92 and 93 define the aperture 91.

For reduced magnification, the lens assembly 88 is moved parallel and perpendicular to the optical path in accordance with equations (7) and (11) respectively. In addition, the mirror 89 is moved rightwardly by $(1/2\lambda)(1-\lambda^2)f$ as indicated in phantom line.

FIG. 8 shows another copying machine 101 comprising an optical system 110. A photoconductive drum 102 is rotated counterclockwise at constant speed and an original document 103 is moved rightwardly at the same surface speed as the drum 102 for $\lambda=1$. A lamp 104 illuminates the document 103 and a mirror 106 reflects an image thereof onto a mirror 107. From the mirror 107 the image is refracted and reflected by a variable focal length lens assembly 108 which is essentially similar to the lens assembly 48 onto a mirror 109. From the mirror 109 the image is reflected through an aperture 111 defined by aperture plates 112 and 113 onto the drum 102. The lens assembly 108 comprises lens elements 108a and 108b and a mirror 108c.

To change from $\lambda=1$ to $\lambda<1$, the lens assembly 108 is moved downwardly, or perpendicular to the optical axis in accordance with equation (5). The focal length of the lens assembly 108 is changed from f0 to f1 in accordance with equation (3). The mirrors 107 and 109 are moved leftwardly and rightwardly respectively by the same distance given by equation (2). In addition, the mirrors 107 and 109 are moved downwardly by ½ the distance given by equation (5). If, however, the mirrors 107 and 109 are made with large surfaces the downward movement may be eliminated.

FIG. 9 shows yet another copying machine 121 which comprises a photoconductive drum 122 which is shown in fragmentary form. The drum 122 is rotated counterclockwise so that the surface portion thereof which is shown in the drawing moves rightwardly. An original document 123 is moved leftwardly. An optical system 124 comprises a single mirror 126 which reflects an image of the document 123 to a lens assembly 127 which consists of lens elements 127a and 127b and a mirror 127c. From the lens assembly 127 the image is refracted and reflected onto the drum 122 through an aperture 128 defined by aperture plates 129 and 131.

To change from $\lambda=1$ to $\lambda<1$, the mirror 126 and lens assembly 127 are moved downwardly and rightwardly in accordance with equations (2) and (5) respectively in a unitary manner. The focal length of the lens assembly 127 is changed from f0 to f1 in accordance with equation (3).

Any of the arrangements of FIGS. 5 to 9 may be utilized in the present invention. It will be noted that in each arrangement the magnification corresponds to the position of one or more movable elements of the optical system and that the leading edge of the document is positioned at the same place on the platen at the initiation of scanning.

Figure 13:
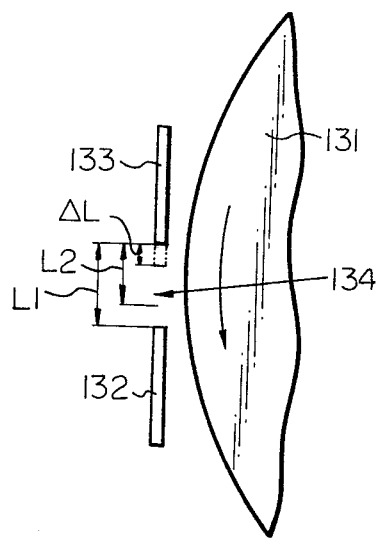
FIG. 13 is a diagram illustrating the principle of exposure control in accordance with the present invention.

Referring now to FIG. 13, an important feature of the present invention is illustrated. A photoconductive drum 131 is shown in fragmentary form and driven counterclockwise at constant speed. An aperture 134 is defined between a fixed aperture plate 132 and a movable aperture plate 133. It is important that in accordance with the present invention the movable aperture plate 133 is disposed upstream of the fixed aperture plate 132 in the direction of rotation of the drum 131.

The movable aperture plate 133 is movable toward and away from the aperture plate 132 to vary the width of the aperture 134 and thereby the intensity of the light image incident on the drum 131. In addition to being a function of the intensity of illumination of the original document, the photoconductive sensitivity of the drum 131 and other factors, the light image intensity is also a function of magnification. In other words, if all other factors are held constant the width of the aperture 134 to produce correct exposure for $\lambda=1$ must be greater than that for $\lambda<1$.

As shown in FIG. 13, it will be assumed that the range of adjustment of the aperture 134 for $\lambda=1$ is a range L1. Increasing the width of the aperture 134 beyond L1 has no effect on the exposure. Similarly, the range of adjustment for a certain value of $\lambda<$ is L2. Whereas movement of the movable aperture plate 133 by an amount $\Delta L$ affects the exposure at any magnification, movement of the fixed aperture plate 132 would not affect the exposure for $\lambda<1$ in the range L1-L2. It has been experimentally determined that movement of the upstream aperture plate affects the exposure at all magnifications whereas movement of the downstream aperture plate does not. Various prior art optical systems utilize the downstream aperture plate for exposure control with the serious drawback that such control is a complicated function of many variables and satisfactory control cannot be attained without the provision of a complicated mechanism.

Figure 10:
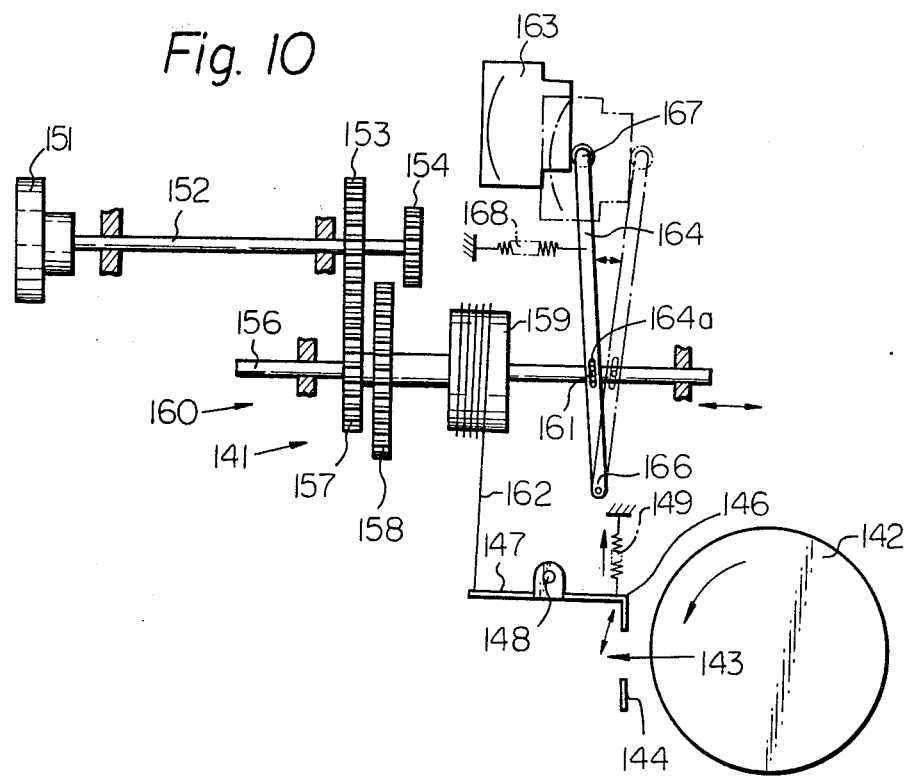
FIG. 10 is a schematic view of an exposure control mechanism of the present invention.

This principle is embodied in an exposure control mechanism of the present invention which is shown in FIG. 10 and generally designated as 141. A photoconductive drum 142 is rotated counterclockwise at constant speed. Although not shown, a light image of a portion of an original document is focussed onto the drum 142 through an aperture 143 defined between a fixed aperture plate 144 and a movable aperture plate 146. The movable aperture plate 146 is provided at the right end of a lever 147 which is pivoted about a shaft 148. A tension spring 149 urges the lever 147 counterclockwise so that the movable aperture plate 146 is moved away from the fixed aperture plate 144.

An exposure adjusting knob 151 is fixed to the left end of an input shaft 152 which is movable in rotation only. Although not shown, gradations are provided to the knob 151 which indicate the relative exposure, or intensity of the light image radiated onto the drum 142. Fixed to the input shaft 152 are a large gear 153 and a small gear 154.

Disposed parallel to the input shaft 152 is an output shaft 156 which is movable in both rotation and translation. Fixed to the shaft 156 are a small gear 157, a large gear 158, a cylindrical drum 159 and a pin 161. A wire 162 is wound around the drum 159 and fixed at its opposite ends to the drum 159 and the left end of the lever 147. The elements thus far described with reference to FIG. 10 constitute a transmission which is generally designated as 160.

Also shown in FIG. 10 is a lens assembly 163 which corresponds to the lens assembly 88 shown in FIG. 7 and the equivalents thereof in the other drawings. The lens assembly 163 is disposed in the solid line position of FIG. 10 for $\lambda = 1$ and is moved to a phantom line position for a certain value of $\lambda < 1$.

An arm 164 is pivotal at its lower end about a pin 166. A roller 167 is provided at the upper end of the arm 164 and a tension spring 168 urges the arm 164 counterclockwise thereby maintaining the roller 167 in engagement with the right end of the lens assembly 163. The arm 164 is formed with a longitudinal slot 164a into which the pin 161 extends.

In operation, the knob 151 is rotated to a maximum exposure position and the magnification is selected. Then, the knob 151 is rotated to select the desired relative exposure.

Where the magnification selected is $\lambda = 1$, the lens assembly 163 is moved to the solid line position. This causes the arm 164 to pivot counterclockwise and, through engagement of the pin 161 and slot 164a, move the output shaft 156 leftwardly. This causes the gears 153 and 157 to mesh. Since the gear 153 is large and the gear 157 is small, a transmission ration greater than unity is provided. In other words, rotation of the knob 151 will result in greater rotation of the drum 159.

Rotation of the knob 151 is transmitted through the transmission 160 to the drum 159 causing the same to rotate and wind the wire 162 further therearound. The lever 147 is rotated clockwise by the wire 162 moving the movable aperture plate 146 closer to the fixed aperture plate 144 and reducing the exposure. The transmission ratio is selected so that rotation of the knob 151 from the maximum exposure position to the minimum exposure position causes the movable aperture plate 146 to move through a range corresponding to L1 in FIG. 13.

Figure 11:
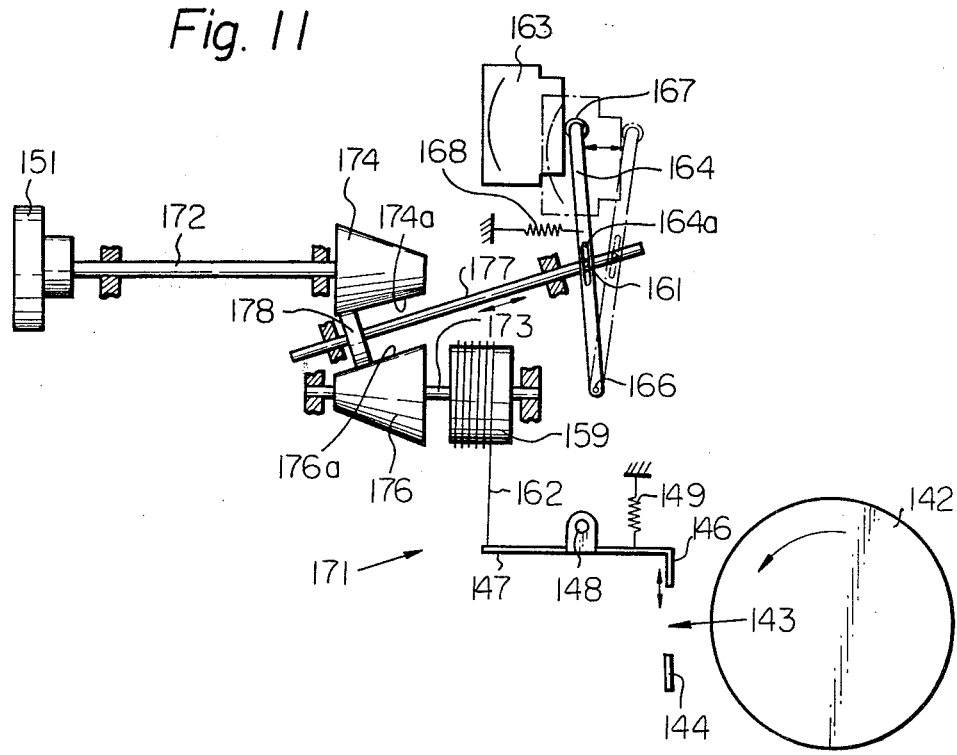
FIG. 11 is similar to FIG. 10 but shows another exposure control mechanism.

For magnification $\lambda < 1$, the lens assembly 163 is moved rightwardly to the phantom line position thereof thereby pivoting the arm 164 clockwise. This moves the output 156 rightwardly so that the gear 154 meshes with the gear 158. Since the gear 154 is smaller than the gear 158, a transmission ratio less than unity is provided. Accordingly, rotation of the knob 151 from the maximum exposure position to the minimum position causes the movable aperture plate 146 to move toward the fixed aperture plate 144 by a smaller range corresponding to L2 in FIG. 13. The different gear ratios provided by the transmission 160 for the respective magnifications ensure that the same relative exposure indicated by the gradations for the knob 151 are provided at all magnifications.

Where the transmission 160 provides various transmission ratios according to magnification in a stepwise manner, a transmission 171 shown in FIG. 11 provides a continuously variable transmission ratio. In FIG. 11, elements essentially similar to those in FIG. 10 are designated by the same reference numerals. In FIG. 11, the knob 151 is fixed to the left end of an input shaft 172 which is movable only in rotation. The drum 159 is fixed to an output shaft 173 which is also movable only in rotation. The shafts 172 and 173 are shown as being parallel, although the invention is not so restricted.

A conical member 174 is fixed to the right end of the shaft 172 adjacent to a conical member 176 fixed to the shaft 173. Adjacent portions 174a and 176a of the conical members 174 and 176 respectively are parallel to each other.

A shaft 177 is disposed between and parallel to the adjacent portions 174a and 176a and is movable both in rotation and translation. The pin 161 is fixed to the shaft 177. A wheel 178 is also fixed to the shaft 177 and drivingly engages with the adjacent portions 174a and 176a.

For $\lambda = 1$, the lens assembly 163 is in the solid line position shown in FIG. 11. The arm 164, shaft 177 and wheel 178 are in their leftmost positions. The wheel 178 engages with a large diameter portion of the conical member 174 and with a small diameter portion of the conical member 176. This provides a transmission ration greater than unity between the knob 151 and drum 159 in a manner corresponding to engagement of the gears 153 and 157 in FIG. 10. Movement of the lens assembly 163 toward the phantom line position in FIG. 11 for $\lambda < 1$, causes the shaft 177 and wheel 178 to be moved rightwardly. The wheel 178 progressively engages with a smaller diameter portion of the conical member 174 and a larger diameter portion of the conical member 176 thereby progressively decreasing the transmission ratio.

Figure 12:
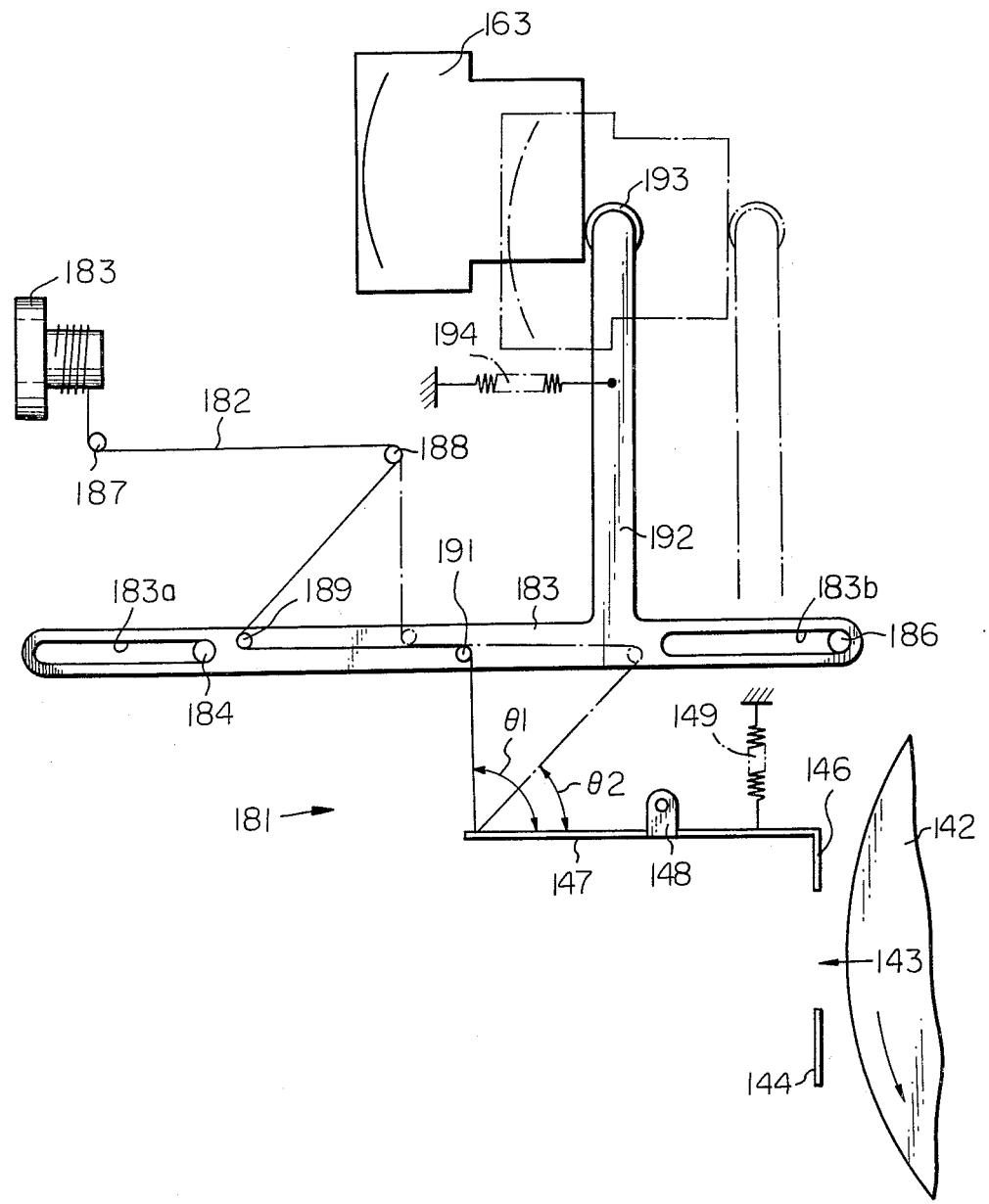
FIG. 12 is also similar to FIG. 10 but shows yet another exposure control mechanism.

Yet another transmission 181 is shown in FIG. 12 which provides continuous variation of the transmission ratio. Again, like elements are designated by the same reference numerals.

In FIG. 12 a wire 182 is wound around an exposure control knob 183 and connected thereto at one end. The other end of the wire 182 is connected to the left end of the lever 147. A transfer bar 183 is provided with longitudinal slots 183a and 183b in which slidingly engage fixed pins 184 and 186 respectively. In this manner, the transfer bar 183 is guided for translation leftwardly and rightwardly. From the knob 183, the wire 182 is trained around, in sequence, fixed pins 187 and 188 and pins 189 and 191 which are fixed to the transfer bar 183 in an axially spaced arrangement. Rotation of the knob 183 winds or unwinds the wire 182 therefrom. This changes the length of the wire 182 between the knob 183 and the lever 147 and pivots the lever 147 clockwise or counterclockwise depending on the direction of rotation of the knob 183.

An arm 192 integrally extends upwardly from the transfer bar 183 and is provided with a roller 193 at its end. A tension spring 194 urges the arm 192 and thereby the transfer bar 183 leftwardly maintaining the roller 193 in engagement with the lens assembly 163.

With the lens assembly 163 in the solid line position for $\lambda = 1$, the arm 192, transfer bar 183, pins 189 and 191 and wire 182 assume their leftmost solid line position. In this position, the portion of the wire 182 between the pin 191 and lever 147 forms an angle $\theta 1$ with the lever 147 which is preferably 90°. Thus, all movement of the wire 182 is converted into rotation of the lever 147 providing a maximum transmission ratio. For $\lambda < 1$, the various components of the transmission 181 are moved rightwardly to their phantom line position in which the portion of the wire 182 between the pin 191 and lever 147 forms an angle $\theta 2$ with the lever 147. In this position, not all movement of the wire 182 is converted to rotation of the lever 147 but only a portion thereof multiplied by sin $\theta 2$, $\theta 2$ is considerably less than 90° and sin $\theta 2$ is considerably less than unity. Thus, a lower transmission ratio is provided for $\lambda < 1$.

Figure 14:
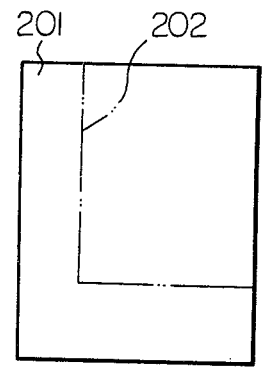
FIG. 14 is a diagram illustrating how original documents of various sizes are formed on a photoconductive drum in accordance with the present invention.

FIG. 14 illustrates how it is desirable to align not only the leading edge of a light image but also the side edge thereof on a photoconductive drum regardless of magnification. This greatly simplifies the mechanism required for scanning and copy sheet feed. In FIG. 14, a full size image is formed on the entire area of a photoconductive drum 201 as indicated in solid line. Indicated in phantom line and designated as 202 is a reduced size image formed on the drum 201 in such a manner that the upper and right edges or ends are aligned.

Figure 16:
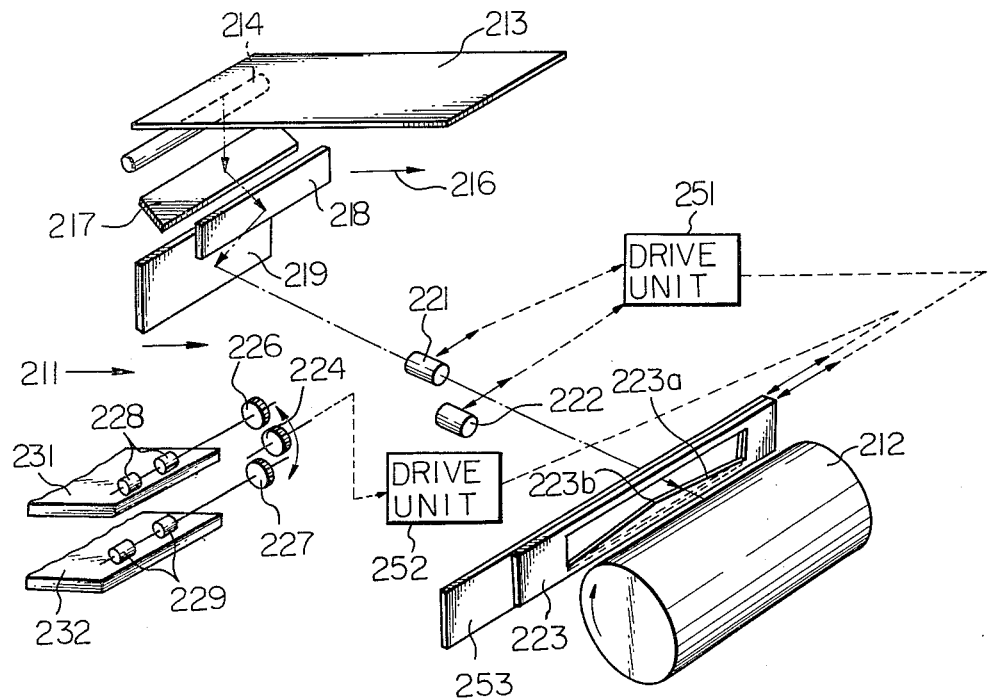
FIG. 16 is a schematic view of an electrostatic copying machine of the present invention embodying the principles of FIGS. 15a to 15c.

FIG. 16 shows an electrostatic copying machine 211 of the present invention which comprises a photoconductive drum 212 which is rotated clockwise at constant speed. An original document 213 is illuminated by a lamp 214 and moved in the direction of an arrow 216 for scanning in the manner described hereinabove. An image of the document 213 is progressively reflected by mirrors 217, 218 and 219 through a lens 221 onto the drum 212 for $\lambda = 1$. For a selected value of $\lambda < 1$ the lens 221 is moved aside and a lens 222 is moved into the optical path of the image. Provided adjacent to the drum 212 is a movable aperture plate 223 which cooperates with a fixed aperture plate (not shown) to adjust the amount of exposure of the drum 121. A drive gear 224 is selectively engageable with gears 226 and 227 which are drivingly connected to feed rollers 228 and 229 respectively. The drive rollers 228 and 229 are operative to feed full size copy sheets 231 and undersized copy sheets 232 respectively to the drum 212.

As is well known in the art, since the optical path at the edges or ends of an optical image is longer than at the center thereof, the intensity of the image is less at the edges than at the center. In order to provide even exposure, an edge 223a of the aperture plate 223 is curved as illustrated in FIGS. 16 and 15a to 15c. More specifically, the center 223b of the edge 223a is closest to the fixed aperture plate. In this manner, the width of the slit or aperture is wider at the edges thereby compensating for the inequality of the length of the optical path and providing even exposure of the drum 212.

Figure 15A:
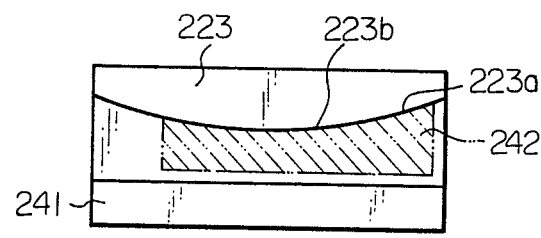
FIGS. 15a to 15c are diagrams illustrating how even exposure is accomplished in the present copying machine regardless of magnification.

Illustrated in FIG. 15a is the aperture plate 223 and also a cooperating fixed aperture plate 241. Designated as 242 is a light image of reduced size ($\lambda < 1$). The light image 242 is aligned with the right side edge of the drum 212 in the manner illustrated in FIG. 14. Therefore, the width of the light image 242 is greater at the right end than at the left end thereof due to the curvature of the edge 223a of the aperture plate 223. In other words, the center 223b of the edge 223a does not align with the center of the image 242.

Figure 15B:
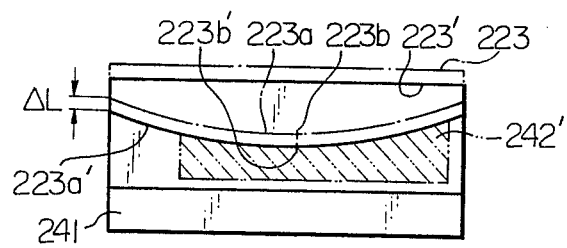

In FIG. 15b the aperture plate 223 is moved toward the fixed aperture plate 241 to adjust the exposure. The phantom line position of the aperture plate 223 in FIG. 15b corresponds to the position of FIG. 15a. The solid line position of FIG. 15b in which like elements are designated by the same reference numerals primed indicates movement of the aperture plate 223 toward the aperture plate 241 by a distance $\Delta L$. It will be seen that the exposure adjustment results in greater unevenness of the light image, here designated as 242'.

Figure 15C:
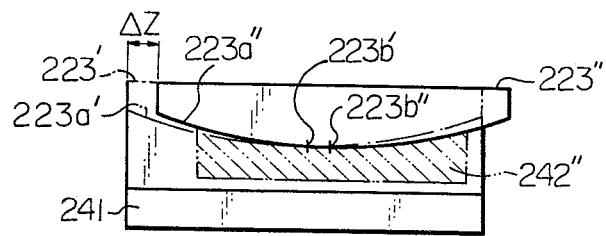

FIG. 15c shows how, in accordance with the present invention, evenness of the light image is restored. This is accomplished by shifting the aperture plate 223 rightwardly by a distance $\Delta Z$. In the final position indicated in solid line in FIG. 15c like elements are designated by the same reference numerals double primed. It will be seen that the center 233b" of the aperture plate 223" is aligned with the center of the light image 242" and that the intensity of the light image is the same at both ends thereof.

Illustrated in FIG. 6 is a drive unit 251 connecting the lenses 221 and 222 to the aperture plate 223 in such a manner that the aperture plate 223 is axially positioned in accordance with the position of one or both of the lenses 221 and 222 and thereby in accordance with the magnification. The amount by which the aperture plate 223 must be shifted is advantageously calculated by applying equation (11) to the transverse direction.

Figure 17:
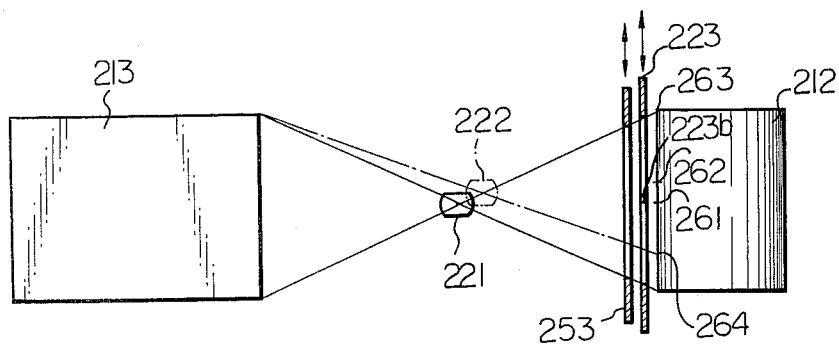
FIG. 17 is a diagram further illustrating the principles of FIGS. 15a to 15c.

Also shown in FIG. 16 is a drive unit 252 connecting the gear 224 with an end plate 253. The function of the end plate 253 is most clearly shown in graphical form in FIG. 17. It is assumed that the document 213 is of maximum size. The lens 221 focusses an image of the document 213 onto the drum 212 as illustrated in solid line with the upper side edges thereof aligned as viewed in the drawing. The lower side edges of the image and drum 212 also align. For reduced size copying the lens 222 focusses an image on the drum 212 as shown in phantom line which also has the upper side edge thereof aligned with the drum 212. However, the lower side edge of the image is spaced upwardly from the lower side edge of the drum 212.

For $\lambda = 1$, the center 223b of the edge 223a of the aperture plate 223 is aligned with the center of the full size image which is designated as 261. For $\lambda < 1$, the aperture plate 223 is shifted upwardly by the drive unit 251 so that the center 223b aligns with the center of the reduced size image which is designated as 262.

In order to conserve copy paper, it is desirable for reduced size copying to use the undersized copy sheets 232 having a width equal to that of the reduced size image. To prevent deterioration of the drum 212 and other undesirable effects, it is desirable to prevent the drum 212 from being imaged in the excess portion thereof in which a toner image is not transferred to the undersized copy sheet 232. The end plate 253 is positioned by the drive unit 252 to block light from reaching the drum 212 except between points designated as 263 and 264 which correspond to the upper and lower side edges of the reduced size image and also to the width of the undersized copy sheets 232.

Since the gear 224 is moved axially to selectively engage the gears 226 and 227, the width of the copy sheet selected corresponds to the position of the gear 224. This position is sensed by the drive unit 252 to properly position the end plate 253.

Various modifications are possible for those skilled in the art after receiving the teachings of the present disclosure without departing from the scope thereof. For example, the end plate 253 may be positioned in accordance with displacement of the lenses 221 and 222 rather than by the position of the gear 224. Another typical modification would be to form the curved edge on the fixed aperture plate rather than the movable aperture plate and axially position the fixed aperture plate as a function of magnification.

What is claimed is:

1. An electrostatic copying machine comprising:
   a rotary photoconductive member;
   a fixed aperture plate disposed adjacent to the photoconductive member;
   a movable aperture plate disposed adjacent to the fixed aperture plate and being formed with a curved edge, the fixed and movable aperture plates defining an aperture therebetween;
   a variable magnification optical means for focussing an image of a portion of an original document through the aperture onto the photoconductive member;
   the optical means being constructed so that an image of a leading edge of the document in a direction of scanning is focussed through the aperture at an initiation of scanning at all magnifications;
   the optical means being connected to the movable aperture plate in such a manner as to axially position the movable aperture plate so that a center of the curved edge aligns with a center of the image at all magnifications.

2. A copying machine as in claim 1, in which the movable aperture plate is disposed upstream of the fixed aperture plate, the curved edge of the movable aperture plate facing the fixed aperture plate and being formed in such a manner as to be closest to the fixed aperture plate at a center of the curved edge.

3. A copying machine as in claim 1, in which the movable aperture plate is disposed parallel to the fixed aperture plate.

4. A copying machine as in claim 2 or 3, further comprising a manually movable adjusting member for moving the movable aperture plate toward and away from the fixed aperture plate to adjust the aperture.

5. A copying machine as in claim 4, further comprising a variable transmission connected between the adjusting member and the movable aperture plate, the transmission being connected to the optical means in such a manner that a transmission ratio of the transmission is controlled in accordance with the magnification.

6. A copying machine as in claim 5, in which the optical means comprises a movable optical member, a position of which determines magnification, the transmission being connected to the optical member is such a manner that the transmission ratio is controlled in accordance with the position of the optical member.

7. A copying machine as in claim 6, in which the transmission ratio of the transmission is variable in a stepwise manner.

8. A copying machine as in claim 7, in which the transmission comprises a plurality of gears, the optical member meshing the gears in a predetermined manner in dependence on the position of the optical member to provide respective transmission ratios.

9. A copying machine as in claim 7, in which the transmission comprises a rotary input shaft fixed to the adjusting member, a plurality of input gears fixedly mounted on the input shaft, an output shaft axially movable relative to the input shaft, a plurality of output gears fixedly mounted on the output shaft and connecting means connecting the output shaft to the movable aperture plate in such a manner that rotation of the output shaft in opposite directions causes movement of the movable aperture plate toward and away from the fixed aperture plate respectively, the output shaft being connected to the optical member in such manner as to be axially movable thereby and mesh corresponding input and output gears in accordance with the position of the optical member.

10. A copying machine as in claim 9, in which said connecting means comprises a wire wound around the output shaft and being connected at its opposite ends to the output shaft and movable aperture plate respectively.

11. A copying machine as in claim 6, in which the transmission ratio of the transmission is variable in a continuous manner.

12. A copying machine as in claim 11, in which the transmission comprises a rotary input conical member fixed to the adjusting member, a rotary output conical member, connecting means connecting the output conical member to the movable aperture plate in such a manner that rotation of the output conical member in opposite directions causes movement of the movable aperture plate toward and away from the fixed aperture plate respectively, the output conical member being disposed adjacent to the input conical member in such a manner that adjacent portions of the input and output conical members respectively are parallel, and a wheel drivingly engaging with said adjacent portions respectively, the wheel being axially movable parallel to said adjacent portions by the optical member to vary the transmission ratio in accordance with the position of the optical member.

13. A copying machine as in claim 12, in which said connecting means comprises a cylindrical member coaxially fixed to the output conical member and a wire wound around the cylindrical member, the wire being fixed at its opposite ends to the cylindrical member and the movable aperture plate respectively.

14. A copying machine as in claim 11, in which the adjusting member is rotatable, the transmission comprising a wire wound around the adjusting member and being fixed at its opposite ends to the adjusting member and the movable aperture plate, the transmission further comprising an engaging member connected to the optical member and engaging with the wire between the adjusting member and the movable aperture plate in such a manner as to vary an angle of the wire between the engaging member and the movable aperture plate in accordance with the position of the optical member.

15. A copying machine as in claim 14, in which the engaging member comprises a bar axially movable by the optical member and two axially spaced pins fixed to the bar, the wire being trained around the pins.

16. A copying machine as in claim 1, further comprising a sheet feed mechanism operative to feed a plurality of widths of copy paper to the photoconductive member, the optical means being arranged so that an end of the image is axially aligned with a predetermined fixed point at all magnifications, the copying machine further comprising an end plate movable by the sheet feed mechanism in accordance with a selected width of the copy paper to allow only a portion of the image to pass through the aperture between said predetermined fixed point and a point axially spaced from said predetermined fixed point by said selected width of the copy paper.

17. An electrostatic copying machine comprising:
   a rotary photoconductive member;

a fixed aperture plate disposed adjacent and parallel to the photoconductive member;

a movable aperture plate disposed adjacent and parallel to the photoconductive member and the fixed aperture plate, the fixed and movable aperture plates defining an aperture therebetween;

a platen for supporting an original document; and a variable magnification optical means for focusing an image of a portion of the original document through the aperture onto the photoconductive member;

the optical means comprising a movable member, the position of which determines the magnification, a curved edge of the movable aperture plate facing the fixed aperture plate being formed in such a manner as to be closest to the fixed aperture plate at a center of said curved edge, the movable member being connected to the movable aperture plate in such a manner as to axially position the movable aperture plate so that the center of said curved edge aligns with a center of said image at all magnifications.

18. An electrostatic copying machine comprising:
a rotary photoconductive member;
a fixed aperture plate disposed adjacent and parallel to the photoconductive member;
a movable aperture plate disposed adjacent and parallel to the photoconductive member and the fixed aperture plate, the fixed and movable aperture plates defining an aperture therebetween;
a platen for supporting an original document;
a variable magnification optical means for focusing an image of a portion of the original document through the aperture onto the photoconductive member;
drive means for producing relative movement between the platen and the optical means at a scanning speed selected in accordance with a rotational speed of the photoconductive member; and
a sheet feed mechanism operative to feed a plurality of widths of copy paper to the photoconductive member, the optical means being arranged so that an end of said image is axially aligned with a predetermined fixed point at all magnifications, the copying machine further comprising an end plate movable by the sheet feed mechanism in accordance with a selected width of the copy paper to allow only a portion of said image to pass through the aperture between said predetermined fixed point and a point axially spaced from said predetermined fixed point by said selected width of the copy paper.

19. An electrostatic copying machine comprising:
a rotary photoconductive member;
a fixed aperture plate disposed adjacent and parallel to the photoconductive member;
a movable aperture plate disposed adjacent and parallel to the photoconductive member and the fixed aperture plate, the fixed and movable aperture plates defining an aperture therebetween;
a platen for supporting an original document;
a variable magnification optical means for focusing an image of a portion of the original document through the aperture onto the photoconductive member;
drive means for producing relative movement between the platen and the optical means at a scanning speed selected in accordance with a rotational speed of the photoconductive member;

the optical means being constructed so that an image of a leading edge of the document in a direction of scanning is focussed through the aperture at an initiation of scanning at all magnifications and the movable aperture plate being disposed upstream of the fixed aperture plate in a direction of rotation of the photoconductive member;

a manually movable adjusting member connected to the movable aperture plate for moving the movable aperture plate toward and away from the fixed aperture plate to adjust the aperture;

a variable transmission connected between the adjusting member and the movable aperture plate, the transmission being connected to the optical means in such a manner that a transmission ratio of the transmission is controlled in accordance with the magnification;

the optical means comprising a movable member, a position of which determines the magnification, the transmission being connected to the movable member in such a manner that the transmission ratio is controlled in accordance with the position of the movable member;

the transmission ratio of the transmission being variable in a stepwise manner, the transmission comprising a plurality of gears, the movable member meshing the gears in a predetermined manner in dependence on the position of the movable member to provide respective transmission ratios.

20. An electrostatic copying machine compsising:
a rotary photoconductive member;
a fixed aperture plate disposed adjacent and parallel to the photoconductive member;
a movable aperture plate disposed adjacent and parallel to the photoconductive member and the fixed aperture plate, the fixed and movable aperture plates defining an aperture therebetween;
a platen for supporting an original document;
a variable magnification optical means for focussing an image of a portion of the original document through the aperture onto the photoconductive member;
drive means for producing relative movement between the platen and optical means at a scanning speed selected in accordance with a rotational speed of the photoconductive member;
the optical means being constructed so that an image of a leading edge of the document in a direction of scanning is focussed through the aperture at an initiation of scanning at all magnifications and the movable aperture plate being disposed upstream of the fixed aperture plate in a direction of rotation of the photoconductive member;
a manually movable adjusting member connected to the movable aperture plate for moving the movable aperture plate toward and away from the fixed aperture plate to adjust the aperture;
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member, the transmission ratio of the transmission being variable in a stepwise manner;

the transmission comprising a rotary input shaft fixed to the adjusting member, a plurality of input gears fixedly mounted on the input shaft, an output shaft axially movable relative to the input shaft, a plurality of output gears fixedly mounted on the output shaft and connecting means connecting the output shaft to the movable aperture plate in such a manner that rotation of the output shaft in opposite directions causes movement of the movable aperture plate toward and away from the fixed aperture plate respectively, the output shaft being connected to the movable member in such a manner as to be axially movable thereby and mesh corresponding input and output gears in accordance with the position of the movable member.

21. A copying machine as in claim 20, in which said connecting means comprises a wire wound around the output shaft and being connected at its opposite ends to the output shaft and movable aperture plate respectively.

22. An electrostatic copying machine comprising:
a rotary photoconductive member;
a fixed aperture plate disposed adjacent and parallel to the photoconductive member;
a movable aperture plate disposed adjacent and parallel to the photoconductive member and the fixed aperture plate, the fixed and movable aperture plates defining an aperture therebetween;
a platen for supporting an original document;
a variable magnification optical means for focussing an image of a portion of the original document through the aperture onto the photoconductive member;
drive means for producing relative movement between the platen and the optical means at a scanning speed selected in accordance with a rotational speed of the photoconductive member;
the optical means being constructed so that an image of a leading edge of the document in a direction of scanning is focussed through the aperture at an initiation of scanning at all magnifications and the movable aperture plate being disposed upstream of the fixed aperture plate in a direction of rotation of the photoconductive member;
a manually movable adjusting member connected to the movable aperture plate for moving the movable aperture plate toward and away from the fixed aperture plate to adjust the aperture;
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member, the transmission ratio of the transmission being variable in a continuous manner;
the transmission comprising a rotary input conical member fixed to the adjusting member, a rotary output conical member, connecting means connecting the output conical member to the movable aperture plate in such a manner that rotation of the output conical member in opposite directions causes movement of the movable aperture plate toward and away from the fixed aperture plate respectively, the output conical member being disposed adjacent to the input conical member in such a manner that adjacent portions of the input and output conical members are parallel, and a wheel drivingly engaging with said adjacent portions respectively, the wheel being axially movable parallel to said adjacent portions by the movable member to vary the transmission ratio in accordance with the position of the movable member.

23. A copying machine as in claim 22, in which said connecting means comprises a cylindrical member coaxially fixed to the output conical member and a wire wound around the cylindrical member, the wire being fixed at its opposite ends to the cylindrical member and the movable aperture plate respectively.

24. An electrostatic copying machine comprising:
a rotary photoconductive member;
a fixed aperture plate disposed adjacent and parallel to the photoconductive member;
a movable aperture plate disposed adjacent and parallel to the photoconductive member and the fixed aperture plate, the fixed and movable aperture plates defining an aperture therebetween;
a platen for supporting an original document;
a variable magnification optical means for focussing an image of a portion of the original document through the aperture onto the photoconductive member and drive means for producing relative movement between the platen and the optical means at a scanning speed selected in accordance with a rotational speed of the photoconductive member;
the optical means being constructed so that an image of a leading edge of the document in a direction of scanning is focussed through the aperture at an initiation of scanning at all magnifications and the movable aperture plate being disposed upstream of the fixed aperture plate in a direction of rotation of the photoconductive member;
a manually movable adjusting member connected to the movable aperture plate for moving the movable aperture plate toward and away from the fixed aperture plate to adjust the aperture;
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member, the transmission ratio of the transmission being variable in a continuous manner;
the adjusting member being rotatable, the transmission comprising a wire wound around the adjusting member and being fixed at its opposite ends to the adjusting member and the movable aperture plate, the transmission further comprising an engaging member connected to the movable member and engaging with the wire between the adjusting member and the movable aperture plate in such a manner as to vary an angle of the wire between the engaging member and the movable aperture plate in accordance with the position of the movable member.

25. A copying machine as in claim 24, in which the engaging member comprises a bar axially movable by the movable member and two axially spaced pins fixed to the bar, the wire being trained around the pins.

26. An electrostatic copying machine comprising:
a rotary photoconductive member;
a fixed aperture plate disposed adjacent and parallel to the photoconductive member;
a movable aperture plate disposed adjacent and parallel to the photoconductive member and the fixed aperture plate, the fixed and movable aperture plates defining an aperture therebetween;
a platen for supporting an original document;
a variable magnification optical means for focussing an image of a portion of the original document through the aperture onto the photoconductive member;
drive means for producing relative movement between the platen and optical means at a scanning speed selected in accordance with a rotational speed of the photoconductive member;
a manually movable adjusting member connected to the movable aperture plate for moving the movable aperture plate toward and away from the fixed aperture plate to adjust the aperture;
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member, the transmission ratio of the transmission being variable in a stepwise manner;
the transmission comprising a rotary input shaft fixed to the adjusting member, a plurality of input gears fixedly mounted on the input shaft, an output shaft axially movable relative to the input shaft, a plurality of output gears fixedly mounted on the output shaft and connecting means connecting the output shaft to the movable aperture plate in such a manner that rotation of the output shaft in opposite directions causes movement of the movable aperture plate toward and away from the fixed aperture plate respectively, the output shaft being connected to the movable member in such a manner as to be axially movable thereby and mesh corresponding input and output gears in accordance with the position of the movable member;
said connecting means comprising a wire wound around the output shaft and being connected at its opposite ends to the output shaft and movable aperture plate respectively.

27. An electrostatic copying machine comprising:
a fixed aperture plate;
a movable aperture plate disposed adjacent and parallel to the fixed aperture plate, the fixed and movable aperture plates defining an aperture therebetween;
a variable magnification optical means for focussing an image of a portion of an original document through the aperture;
a manually movable adjusting member connected to the movable aperture plate for moving the movable aperture plate toward and away from the fixed aperture plate to adjust the aperture; and
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member;
the transmission ratio of the transmission being variable in a stepwise manner;
the transmission comprising a plurality of gears, the movable member meshing the gears in a predetermined manner in dependence on the position of the movable member to provide respective transmission ratios.

28. An electrostatic copying machine comprising:
a fixed aperture plate;
a movable aperture plate disposed adjacent and parallel to the fixed aperture plate, the fixed and movable aperture plates defining an aperture therebetween;
a variable magnification optical means for focussing an image of a portion of an original document through the aperture;
a manually movable adjusting member connected to the movable aperture plate for moving the movable aperture plate toward and away from the fixed aperture plate to adjust the aperture; and
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member;
the transmission ratio of the transmission being variable in a stepwise manner;
the transmission comprising a rotary input shaft fixed to the adjusting member, a plurality of input gears fixedly mounted on the input shaft, an output shaft axially movable relative to the input shaft, a plurality of output gears fixedly mounted on the output shaft and connecting means connecting the output shaft to the movable aperture plate in such a manner that rotation of the output shaft in opposite directions causes movement of the movable aperture plate toward and away from the fixed aperture plate respectively, the output shaft being connected to the movable member in such manner as to be axially movable thereby and mesh corresponding input and output gears in accordance with the position of the movable member.

29. A copying machine as in claim 28, in which said connecting means comprises a wire wound around the output shaft and being connected at its opposite ends to the output shaft and movable aperture plate respectively.

30. An electrostatic copying machine comprising:
a fixed aperture plate;
a movable aperture plate disposed adjacent and parallel to the fixed aperture plate, the fixed and movable aperture plates defining an aperture therebetween;
a variable magnification optical means for focussing an image of a portion of an original document through the aperture;
a manually movable adjusting member connected to the movable aperture plate for moving the movable aperture plate toward and away from the fixed aperture plate to adjust the aperture; and
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member;
the transmission ratio of the transmission being variable in a continuous manner;
the transmission comprising a rotary input conical member fixed to the adjusting member, a rotary output conical member, connecting means connecting the output conical member to the movable aperture plate in such a manner that rotation of the output conical member in opposite directions causes movement of the movable aperture plate toward and away from the fixed aperture plate respectively, the output conical member being disposed adjacent to the input conical member in such a manner that adjacent portions of the input and output conical members respectively are parallel, and a wheel drivingly engaging with said adjacent portions respectively, the wheel being axially movable parallel to said adjacent portions by the movable member to vary the transmission ratio in accordance with the position of the movable member.

31. A copying machine as in claim 30, in which said connecting means comprises a cylindrical member coaxially fixed to the output conical member and a wire wound around the cylindrical member, the wire being fixed at its opposite ends to the cylindrical member and the movable aperture plate respectively.

32. An electrostatic copying machine comprising:
a fixed aperture plate;
a movable aperture plate disposed adjacent and parallel to the fixed aperture plate, the fixed and movable aperture plates defining an aperture therebetween;
a variable magnification optical means for focussing an image of a portion of an original document through the aperture;
a manually movable adjusting member connected to the movable aperture plate for moving the movable aperture plate toward and away from the fixed aperture plate to adjust the aperture; and
a variable transmission connected between the adjusting member and the movable aperture plate, the transmission being connected to the optical means in such a manner that a transmission ratio of the transmission is controlled in accordance with the magnification;
the optical means comprising a movable member, a position of which determines the magnification, the transmission being connected to the movable member in such a manner that the transmission ratio is controlled in accordance with the position of the movable member;
the transmission ratio of the transmission being variable in a continuous manner;
the adjusting member being rotatable, the transmission comprising a wire wound around the adjusting member and being fixed at its opposite ends to the adjusting member and the movable aperture plate, the transmission further comprising an engaging member connected to the movable member and engaging with the wire between the adjusting member and the movable aperture plate in such a manner as to vary an angle of the wire between the engaging member and the movable aperture plate in accordance with the position of the movable member.

33. A copying machine as in claim 32, in which the engaging member comprises a bar axially movable by the movable member and two axially spaced pins fixed to the bar, the wire being trained around the pins.

* * * * *